United States Patent [19]

Matsuda et al.

[11] Patent Number: 4,482,024
[45] Date of Patent: Nov. 13, 1984

[54] SUPERCHARGER APPARATUS FOR INTERNAL COMBUSTION ENGINE IN MOTORIZED TWO-WHEELED VEHICLE

[75] Inventors: Minoru Matsuda, Chofu; Takashi Shinozaki, Tokorozawa; Kentaro Kato, Niiza, all of Japan

[73] Assignee: Honda Giken Kogyo Kabushiki Kaisha, Tokyo, Japan

[21] Appl. No.: 277,223

[22] Filed: Jun. 25, 1981

[30] Foreign Application Priority Data

Jun. 26, 1980 [JP] Japan .................................. 55-85865

[51] Int. Cl.³ ............................................. F02D 23/00
[52] U.S. Cl. ..................... 180/219; 60/598; 60/605; 123/559; 180/229; 280/5 A
[58] Field of Search ....................... 180/219, 225, 229; 60/605, 598, 600-604; 280/5 A; 123/559

[56] References Cited

U.S. PATENT DOCUMENTS

| | | | |
|---|---|---|---|
| 1,593,571 | 7/1926 | Curtis | 60/605 |
| 3,673,798 | 7/1972 | Kuehl | 60/605 |
| 4,179,892 | 12/1979 | Heydrich | 60/605 |
| 4,226,296 | 10/1980 | Higaki | 180/219 |
| 4,321,978 | 3/1982 | Tominaga et al. | 180/225 |
| 4,364,340 | 12/1982 | Kimura | 180/219 X |
| 4,396,085 | 8/1983 | Inoue et al. | 180/219 |

FOREIGN PATENT DOCUMENTS

| | | | |
|---|---|---|---|
| 1091580 | 10/1954 | France | 180/225 |
| 118907 | 9/1979 | Japan | 60/605 |
| 146016 | 11/1981 | Japan | 180/219 |
| 148622 | 11/1981 | Japan | 180/219 |
| 52626 | 3/1982 | Japan | 180/219 |

Primary Examiner—Joseph F. Peters, Jr.
Assistant Examiner—Mitchell J. Hill
Attorney, Agent, or Firm—Armstrong, Nikaido, Marmelstein & Kubovcik

[57] ABSTRACT

The present invention is directed to a V-type multi-cylinder internal combustion engine mounted on the middle portion of a vehicle body having front and rear wheels. The internal combustion engine has a supercharger comprising an exhaust turbine provided in an exhaust passage of the engine and a compressor provided in an intake passage of the engine and arranged to be driven by the turbine. In the present invention, an expansion chamber is interposed in the intake passage so as to be positioned between an outlet opening of the compressor and respective intake pipes extending from respective intake ports of the cylinders of the engine. The expansion chamber is placed in a space defined by a V bank of the engine.

4 Claims, 3 Drawing Figures

SUPERCHARGER APPARATUS FOR INTERNAL COMBUSTION ENGINE IN MOTORIZED TWO-WHEELED VEHICLE

BACKGROUND OF THE INVENTION

1. Field of the Invention

The present invention is directed to a supercharger apparatus for an internal combustion engine in a motorized two-wheeled vehicle such as a motorcycle or the like, and more particularly to a supercharger with an expansion chamber.

2. Description of the Prior Art

In superchargers for use with V-type multicylinder internal combustion engines mounted on a vehicle body, the supercharger comprises an exhaust turbine provided in an exhaust passage of the engine and a compressor provided in an intake passage of the engine and arranged to be driven by the turbine. The interposition of an expansion chamber in the intake passage in order to prevent the compressor from surging caused by the intake pulsations generated in respective cylinders of the engine has been considered. However, the expansion chamber itself is comparatively large in size, and therefore, the apparatus tends to be made comparatively large in size as a whole by the interposition of the chamber. Thus, expansion chambers have not been used.

SUMMARY OF THE INVENTION

It is the primary object of the present invention to provide a supercharger for a V-type multicylinder internal combustion engine having an expansion chamber positioned between the legs of the V, for use with a two-wheeled vehicle such as a motorcycle.

It is another object of the present invention to position the expansion chamber so that the upper portion thereof projects into the space defined by the plural main frames of the vehicle.

The present invention is directed to a V-type multicylinder internal combustion engine mounted on the middle portion of a vehicle body having front and rear wheels. The internal combustion engine has a supercharger comprising an exhaust turbine provided in an exhaust passage of the engine and a compressor provided in an intake passage of the engine and arranged to be driven by the turbine. In the present invention, an expansion chamber is interposed in the intake passage so as to be positioned between an outlet opening of the compressor and respective intake pipes extending from respective intake ports of the cylinders of the engine. The expansion chamber is placed in a space defined by a V bank of the engine.

DETAILED DESCRIPTION OF THE PREFERRED EMBODIMENT

Figure 1:
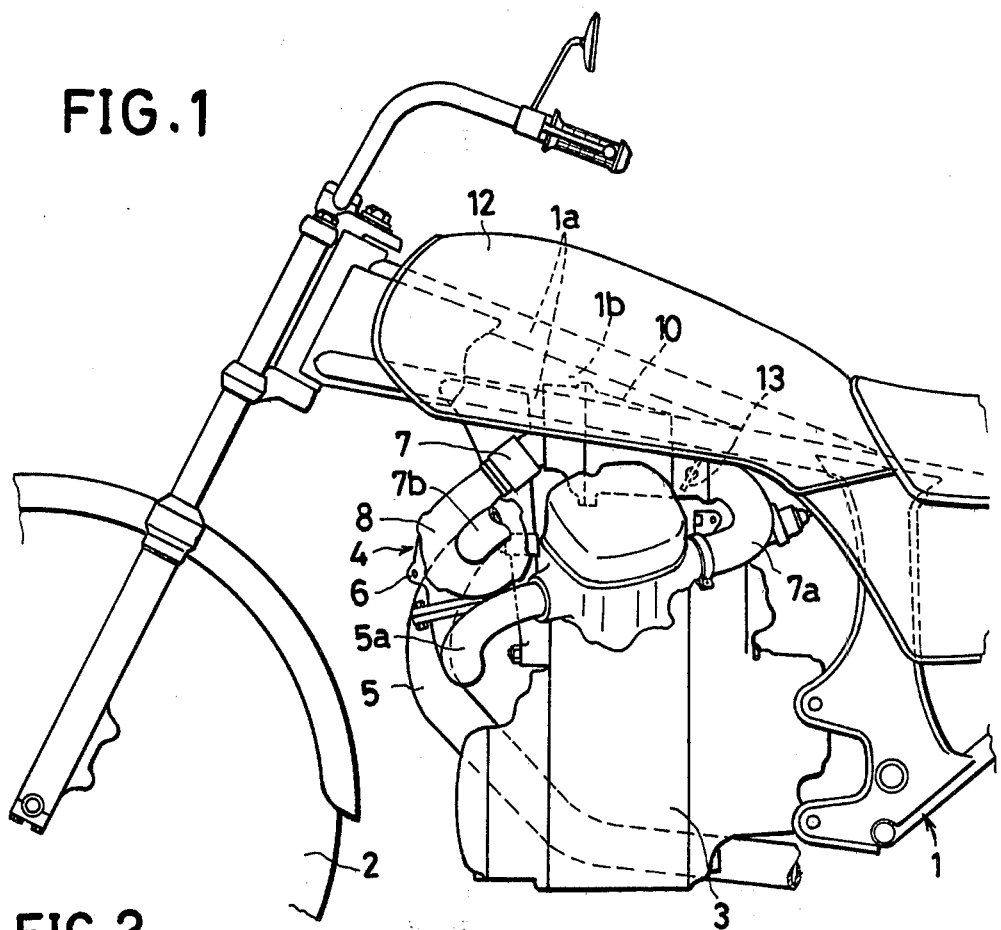
FIG. 1 is a side view of a motorcycle having the preferred embodiment of the present invention.

Referring to the drawings, a vehicle body 1 is provided with a front wheel 2 and a rear wheel (not illustrated) and additionally at its middle portion with a V-type two cylinder internal combustion engine 3 mounted thereon. Thus, a motorized two-wheeled vehicle such as a motorcycle or the like is provided.

Figure 3:
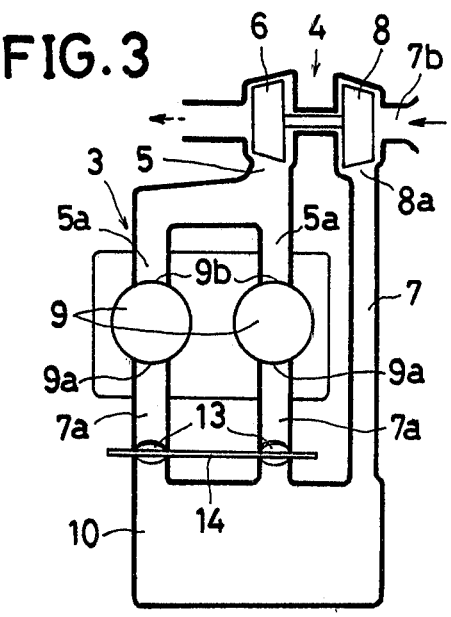
FIG. 3 is an explanation diagram of an intake and exhaust system thereof.

The engine 3 is provided with a supercharger 4. As shown clearly in FIG. 3, the supercharger 4 comprises an exhaust turbine 6 provided in an exhaust passage 5 of the engine 3 and a compressor 8 provided in an intake passage 7 of the engine 3. An expansion chamber 10 is interposed in the intake passage 7 positioned between an outlet opening 8a of the compressor 8 and respective intake pipes 7a, 7a extending from the respective cylinders 9, 9 of the engine 3.

Figure 2:
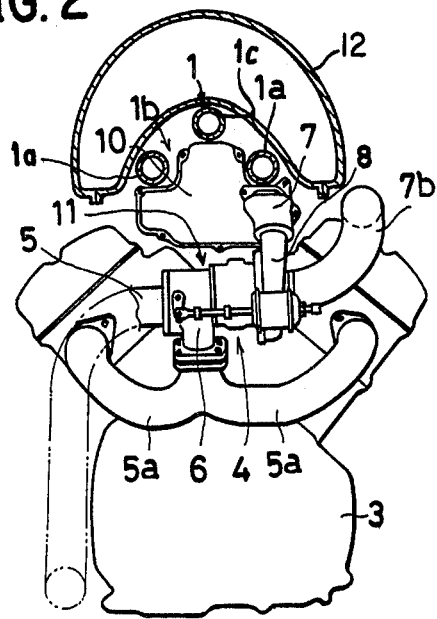
FIG. 2 is a front view, partly in section, thereof.

The expansion chamber 10 is comparatively large in size, and therefore the chamber 10 is positioned, as shown clearly in FIG. 2, in a space 11 defined by the sides of the V of the engine 3 so that the space 11 may be effectively utilized as a space for the installation of the expansion chamber 10.

In the illustrated example, the vehicle body 1 is constructed with plural main frames 1a extending forwardly and rearwardly above the engine 3, and the expansion chamber 10 projects at its upper portion into a space 1b formed by the plural main frames 1a.

The three main frames each comprise a pipe frame extending longitudinally, arranged as a pair of right and left lower ones 1a, 1a and a central higher third frame member 1c. In addition, these are so located as to extend along the bottom surface of a fuel tank 12 provided over the middle portion of the vehicle body 1. The upper portion of the expansion chamber 10 projects into the defined space 1b formed by the frame 1a, 1a, 1c. Thus, by the cooperation of the main frames with the expansion chamber 10 installed in the V space 11, the whole size of the vehicle can be made as small as possible, and additionally, the expansion chamber 10 can be protected from external forces by frames 1a.

The respective intake pipes 7a, 7a are provided therein with respective throttle valves 13, 13 arranged to be moved by an acceleration number such an an acceleration grip or the like (not illustrated).

A joining portion for joining the respective intake pipes 7a, 7a and a single common throttle valve is provided on the downstream side of the expansion chamber 10. Often, the intake pulsations generated in one of the cylinders 9 affects the other of the cylinders 9 by means of the joining portion. This inconvenience can be avoided by providing throttle valves 13, 13 in respective intake tubes 7a, 7a. The transmission of intake pulsations is interrupted by the respective throttle valves 13, 13.

The respective throttle valves 13, 13 are interconnected through a single common operating shaft 14 so as to be moved together by the acceleration member.

Exhaust pipes 5a, 5a are provided on the upstream side of the exhaust passage 5 for connecting respective exhaust ports 9b, 9b of the cylinders 9, 9 to the exhaust turbine 6. An intake pipe 7b is provided on the upstream side of the intake passage 7 for connection to an air cleaner (not illustrated).

Thus, according to the present invention, an expansion chamber, coupled into the intake passage, is positioned in the space between the side of the V formed on the upper surface of the V-type engine, so that space can be effectively utilized and the vehicle can be comparatively small in size.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A supercharger apparatus for an internal combustion engine in a motorized two-wheeled vehicle, wherein an internal combustion engine is mounted on the middle portion of the vehicle body, and wherein the main frame of the vehicle body includes at least a right frame and a left frame extending forwardly and rearwardly above the engine, said supercharger apparatus comprising: an exhaust turbine provided in an exhaust passage of the engine; a compressor provided in an intake passage of the engine and arranged to be driven by the turbine; and an expansion chamber operatively coupled in the intake passage between the outlet opening of the compressor and intake pipes extending from intake ports of the respective cylinders of the engine, said expansion chamber being positioned above the engine and at least partially between said right and left frames.

2. An apparatus as claimed in claim 1, wherein said intake pipes have throttle valves therein, said throttle valves being operated in response to acceleration of said engine.

3. In a motorcycle including a fuel tank disposed intermediately thereof and further including an internal combustion engine provided with a supercharger having an expansion chamber, the improvement which comprises a main frame extending longitudinally of the motorcycle and including a right frame member and a left frame member, the right and left frame members being disposed above the engine and along the bottom surface of the fuel tank, and the expansion chamber being disposed between the engine and the fuel tank, and further being disposed at least partially between the right and left frame members, whereby a relatively-large expansion chamber is provided together with overall compactness, and whereby the expansion chamber is protected from external forces by the right and left frame members.

4. The improvement of claim 3, further including a third frame member also disposed along the bottom surface of the fuel tank, and further disposed intermediately of the right and left frame members and thereabove, the expansion chamber being at least partially disposed within the right, left, and third frame members.

* * * * *